(12) United States Patent  
Ogura et al.

(10) Patent No.: US 6,498,964 B1
(45) Date of Patent: Dec. 24, 2002

(54) JOB PROCESSING SYSTEM USING JOB DESIGNATION SHEET

(75) Inventors: Kazuhiro Ogura, Kanagawa-ken (JP); Takeshi Ogaki, Tokyo (JP); Yoshiko Takeda, Kanagawa-ken (JP); Akinori Iwase, Kanagawa-ken (JP)

(73) Assignees: Toshiba Tec Kabushiki Kaisha, Tokyo (JP); Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/386,231

(22) Filed: Aug. 31, 1999

(30) Foreign Application Priority Data

Sep. 3, 1998 (JP) .......................................... 10-249866

(51) Int. Cl.[7] .............................................. G06F 15/00
(52) U.S. Cl. ..................... 700/213; 707/511; 707/505; 358/401
(58) Field of Search ................................ 700/213, 219, 700/223, 2; 707/505–508, 511; 358/401, 403, 1.9

(56) References Cited

U.S. PATENT DOCUMENTS

| | | | | |
|---|---|---|---|---|
| 5,247,371 | A | | 9/1993 | Hikawa et al. .............. 358/448 |
| 5,280,615 | A | | 1/1994 | Church et al. .............. 395/650 |
| 5,557,736 | A | | 9/1996 | Hirosawa et al. ...... 395/182.02 |
| 5,563,986 | A | | 10/1996 | Suzuki ........................ 395/114 |
| 5,682,247 | A | * | 10/1997 | Webster et al. ............. 358/296 |
| 5,881,283 | A | | 3/1999 | Hondou et al. ............. 395/670 |
| 5,893,124 | A | | 4/1999 | Ogaki et al. ................. 707/507 |
| 5,898,592 | A | * | 4/1999 | Salgado et al. ........ 364/478.02 |
| 6,049,391 | A | * | 4/2000 | Farrell ....................... 358/1.15 |

FOREIGN PATENT DOCUMENTS

| | | |
|---|---|---|
| JP | 5-274128 | 10/1993 |
| JP | 7-105137 | 4/1995 |
| JP | 7-107256 | 4/1995 |
| JP | 8-88707 | 4/1996 |
| JP | 9-147050 | 6/1997 |
| JP | 9-305684 | 11/1997 |
| JP | 11-85691 | 3/1999 |
| JP | 11-110457 | 4/1999 |

\* cited by examiner

*Primary Examiner*—Paul P. Gordon
(74) *Attorney, Agent, or Firm*—Foley & Lardner

(57) ABSTRACT

A job processing system using job designation sheets includes a printer unit to prepare job designation sheets including the description of specified job designation contents and print Sheet Version Number indicating the version of the job designation sheets when editing, a sheet management database to manage versions of job designation sheets based on Version Number printed on the job designation sheets, an image input unit to read job designation sheets with the job designation contents described and Sheet Version Number printed, a sheet recognition unit to recognize the contents of description and Version Number of the job designation sheets that are read by the image input unit and a judging unit to judge whether the Version Number of the sheet recognized by the sheet recognition unit is the latest one based on the version of the job designation sheet managed by the sheet processing management database. When the version of a job designation sheet judged by the sheet recognition unit is the latest version, jobs are processed according to the described contents of the job designation sheet recognized by the sheet recognition unit, and even when the version judged by the judging unit is not the last one, if a difference between the contents designated on the job designation sheet of the latest version and that designated by that job designation sheet is small, jobs are processed based on the described contents of the job designation sheet recognized by the sheet recognition unit.

6 Claims, 13 Drawing Sheets

| JOB ID | EDTION NUMBER | SHEET PROCESSING CONTENTS | SHEET PRINT DATA | EDITOR ADDRESS | DATA PROCESSING METHOD |
|--------|---------------|---------------------------|------------------|----------------|------------------------|
| 108010 | 1 | | | | |
| 108011 | 1 | ▨▨▨ | | editor1@mail | PRINT SHETT & RE-INPUT |
| 108012 | 1 | | | | |
| 108011 | 2 | ▨▨▨ | | editor1@mail | MAIL (TO USER) |
| 108013 | 1 | | | | |
| 108011 | 3 | ▨▨▨ | | editor2@mail | |
| 108012 | 2 | | | | |

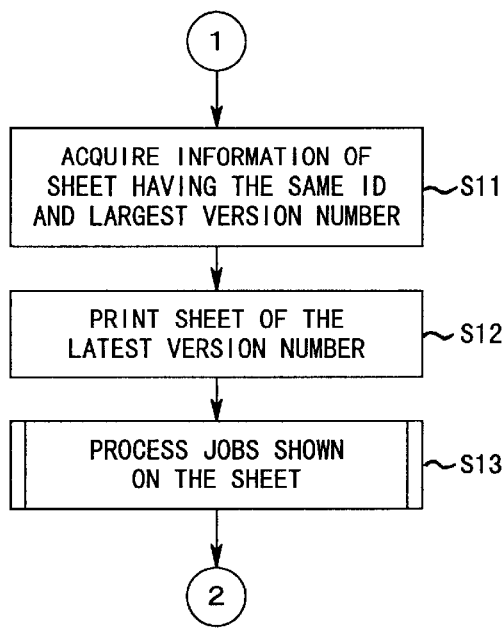
FIG. 4
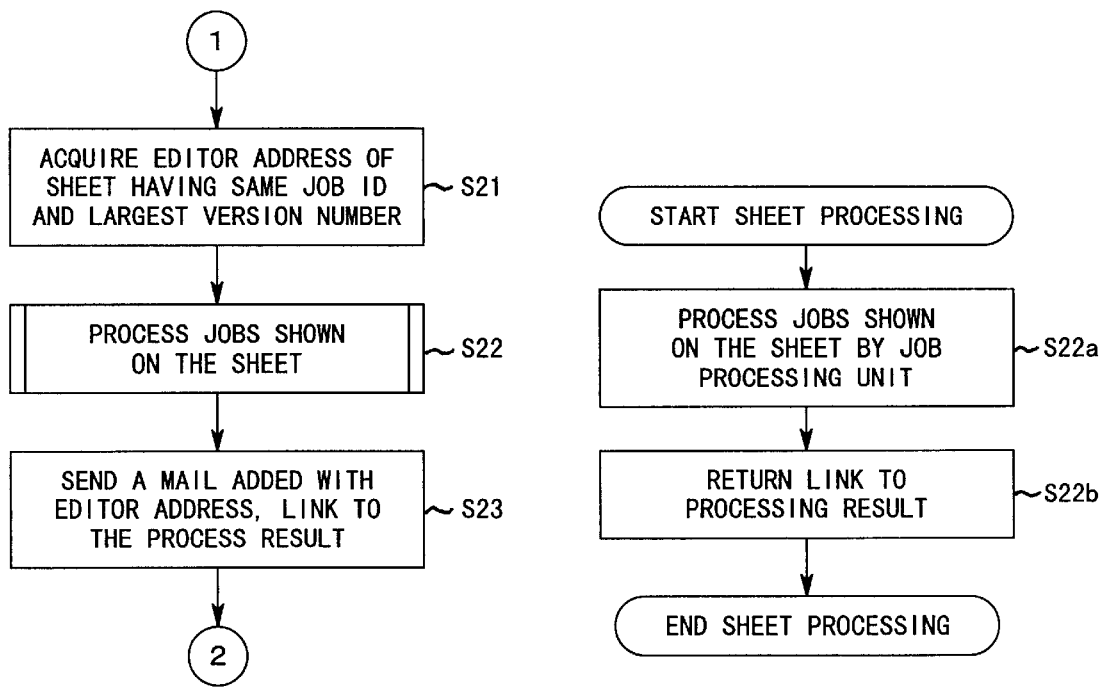
FIG. 5A
FIG. 5B

| | |
|---|---|
| TO: | SHEET USER |
| TITLE: | REQUEST FOR CORRECTION OF SHEET PROCESSED ON MAR. 9, 1998 |
| TEXT: | |
| | THE SHEET USED BY YOU ON 10:05 AM, MAR. 9, 1998 WAS EDITED AND THE PROCESSING CONTENTS WERE CHANGED. THE PROCESSING WAS MADE ACCORDING TO OLD CONTENTS AND STORED HERE (LINK). PLEASE CORRECT TO MEET THE LATEST SHEET CONTENTS. INQUIRE SHEET EDITOR (editor@mail) FOR DETAIL. |

FIG. 6

| ENTER USER ID/PASSWORD | | |
|---|---|---|
| USER ID: | 97433829 | |
| PASSWORD: | ******* | |

FIG. 7

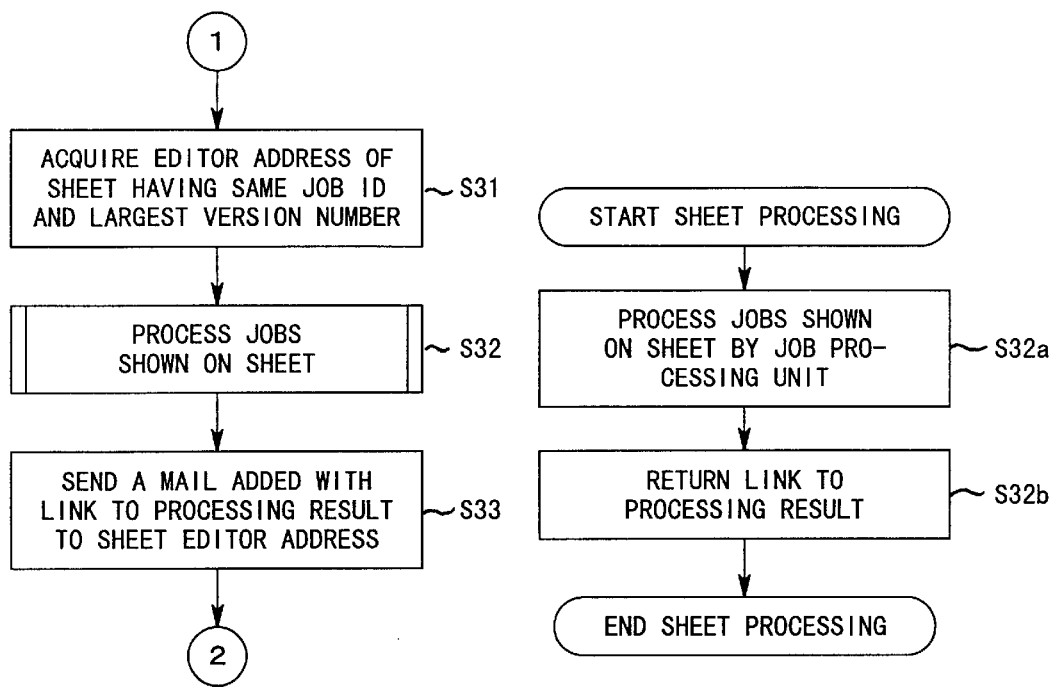

FIG. 8A          FIG. 8B

| TO: | editor@mail |
| TITLE: | JOB DESIGNATION SHEET OF OLD VERSION WAS USED |
| TEXT: | |
| VERSION OF SHEET EDITED ON 10:05 AM, MAR. 9, 1998 BY YOU WAS USED BY user@mail.<br>JOB WAS PROCESSED ACCORDING TO JOB CONTENTS SHOWN ON THE SHEET OF OLD VERSION AND STORED HERE (LINK).<br>RE-PROCESS IT TO MEET THE LATEST SHEET CONTENTS. | |

FIG. 9

JOB DESIGNATION USED BY YOU WAS EDITED

SELECT METHOD TO DEAL SHOWN BELOW:
  PRINT AND RE-ENTER LATEST VERSION
PROCESS ACCORDING TO CONTENTS OF USED JOB DESIGNATION SHEET
  PRINT SHEET OF LATEST VERSION
  CORRECT LATER (COMMUNICATION WITH MAIL)
  ASK CORRECTION OF JOB DESIGNATION SHEET TO EDITOR

FIG. 10

| PRIORITY | DEALING METHOD |
|---|---|
| 1 (HIGH) | PRINT SHEET & RE-INPUT |
| 2 | PROCESS JOBS SHOWN ON SHEET & MAIL TO EDITOR |
| 3 | PROCESS JOBS SHOWN ON SHEET & MAIL TO USER |
| 4 | PROCESS JOBS SHOWN ON SHEET & PRINT JOB DESIGNATION SHEET OF LATEST VERSION |
| 5 (LOW) | PROCESS JOBS SHOWN ON SHEET |

| | |
|---|---|
| JOB DESIGNATED SHEET USED BY YOU WAS EDITED. | |
| LATER CORRECITON (COMMUNICATION BY MAIL) IS DESIGNATED AS A DEALING METHOD WHEN EDITED. CAN BE PROCESSED AS IT IS ? YES (EXECUTE AND REPORT BY A MEIL NO (CANCEL THE EXECUTION) | |

FIG. 15

| JOB ID | EDTION NUMBER | SHEET PROCESSING CONTENTS | SHEET PRINT DATA | EDITOR ADDRESS | DATA PROCESSING METHOD |
|---|---|---|---|---|---|
| 108010 | 1 | | | | |
| 108011 | 1 | ///// | | editor1@mail | PRINT SHETT & RE-INPUT |
| 108012 | 1 | | | | |
| 108011 | 2 | ///// | | editor1@mail | MAIL (TO EDITOR) |
| 108013 | 1 | | | | |
| 108011 | 3 | ///// | | editor2@mail | MAIL (TO EDITOR) |
| 108012 | 2 | | | | |
| 108011 | 4 | | | editor2@mail | |

FIG. 16

| USER ID | PASSWORD | ADDRESS |
|---|---|---|
| 9 7 4 3 3 8 2 9 1 | 1 2 3 4 5 6 7 8 9 | user1@mail |
| 9 2 9 3 8 4 7 5 3 | 9 8 7 6 5 4 3 2 1 | user2@mail |
| 8 5 8 3 7 4 7 2 6 | 4 8 3 7 2 6 1 9 3 | user3@mail |

FIG. 17

| JOB ID | EDTION NUMBER | SHEET PROCESSING CONTENTS | SHEET PRINT DATA | EDITOR ADDRESS | DATA PROCESSING METHOD |
|---|---|---|---|---|---|
| 108010 | 1 | | | | |
| 108011 | 1 | ▨▨▨ | | editor1@mail | MAIL (TO USER) |
| 108012 | 1 | | | | |
| 108011 | 2 | ▨▨▨ | | editor1@mail | UNNECESSARY (LATEST VERSION) |

| JOB ID | EDTION NUMBER | SHEET PROCESSING CONTENTS | SHEET PRINT DATA | EDITOR ADDRESS | DATA PROCESSING METHOD |
|---|---|---|---|---|---|
| 108010 | 1 | | | | |
| 108011 | 1 | ▨ | | editor1@mail | MAIL (TO USER) |
| 108012 | 1 | | | | |
| 108011 | 2 | ▨ | | editor1@mail | SHEET PROCESS & PRINT SHEET |
| 108013 | 1 | | | | |
| 108011 | 3 | ▨ | | editor2@mail | UNNECESSARY (LATEST VERSION) |

| JOB ID | EDTION NUMBER | SHEET PROCESSING CONTENTS | SHEET PRINT DATA | EDITOR ADDRESS | DATA PROCESSING METHOD |
|---|---|---|---|---|---|
| 108010 | 1 | | | | |
| 108011 | 1 | ▨▨▨ | | editor1@mail | PRINT SHEET & RE-INPUT |
| 108012 | 1 | | | | |
| 108011 | 2 | ▨▨▨ | | editor1@mail | PRINT SHEET & RE-INPUT |
| 108013 | 1 | | | | |
| 108011 | 3 | ▨▨▨ | | editor2@mail | PRINT SHEET & RE-INPUT |
| 108012 | 2 | | | | |
| 108011 | 4 | | | editor2@mail | UNNECESSARY (LATEST VERSION) |

| JOB ID | EDTION NUMBER | SHEET PROCESSING CONTENTS | SHEET PRINT DATA | EDITOR ADDRESS | DATA PROCESSING METHOD |
|---|---|---|---|---|---|
| 108010 | 1 | | | | |
| 108011 | 1 | ▨▨▨ | | editor1@mail | PRINT SHEET & RE-INPUT |
| 108012 | 1 | | | | |
| 108011 | 2 | ▨▨▨ | | editor1@mail | PRINT SHEET & RE-INPUT |
| 108013 | 1 | | | | |
| 108011 | 3 | ▨▨▨ | | editor2@mail | PRINT SHEET & RE-INPUT |
| 108012 | 2 | | | | |
| 108011 | 4 | | | editor2@mail | MAIL (TO USER) |
| 108014 | 1 | | | | |
| 108011 | 5 | | | editor2@mail | UNNECESSARY (LATEST VERSION) |

JOB PROCESSING SYSTEM USING JOB DESIGNATION SHEET

BACKGROUND OF THE INVENTION

1. Field of the Invention

The present invention relates to a job designation processing system using a job designation sheet to recognize job designated contents written on the job designated sheet and execute specified matters according to the contents and more particularly to a job designation/processing system to judge whether an edition number written on the job designation sheet is the latest one by a management unit and execute specified processing.

2. Description of the Related Art

A method for automatically executing a job using a job designation sheet that is so designed to designate job process by checking marks is so far used in various fields.

In particular, for a job to enter an image on a paper document and process the entered image, a job designation sheet and such a paper document as a catalog, an object of that process or a document to be copied are treated in one set. A job designation/processing system using a job designation sheet capable of inputting it to a reader such as a scanner is very convenient and various proposals have been made so far by many enterprises.

Even users who have no knowledge of details of jobs will become capable of executing jobs.

Now, under this using environment, let's consider a case wherein an editor who edited a job designation sheet to change a format reflected on that job designation sheet.

As each user has a hard copy of a job designation sheet, there is always the possibility for using an unedited job designation sheet after it was edited.

If an unedited job designation sheet was used, a job is processed according to the contents described on the unedited job designation sheet and thus, a job might become confused.

For this reason, when data described on an unedited job designation sheet are read and input by a reader, it is a general practice to regard the input as an erroneous input and prevent the input of an unedited job designation sheet.

The Japanese Patent Disclosure (Kokai) No. 9-305684 discloses a system which not only reports to the job designation sheet users that the job designation sheets cannot be used but also reduces a time of user needed for acquiring the latest edition of the job designation sheets (a time for distribution when viewed from the standpoint of a job designation sheet editor).

In this Japanese Patent Disclosure Kokai) No. 9-305684, a technology is disclosed to acquire the latest edition of the job designation sheet after edited without bothering sheet editors by judging new or old of a job designation sheet when it is used and printing it immediately.

As described above, when an job designation sheet before edited was used, it was regarded as an error and its input was rejected so far.

However, if a job designation sheet that is desired by user to use in an old edition before the edition and rejected to use, three steps; "Acquisition of New Edition", "Re-designation" and "Re-reading" become newly necessary for user.

Regarding "Acquisition of New Edition", a means to acquire the latest edition according to a print time only was disclosed in the Japanese Patent Disclosure (Kokai) No. 9-305684. However, the process by three steps: "Printing of New Edition", "Re-designation" and "Re-input" is still required.

When considering the editing contents of individual sheet, some cases are observed, wherein the input of an old job designation sheet before edited is not necessarily regarded as an error.

For instance, when the sheet layout was changed to the layout easy to see or jobs to be processed are increased.

In the former case, there is entirely no problem to use a sheet before edited and in the latter case, a sheet before edited is sufficient for jobs prior to increasing the number of jobs.

Further, even when use of sheets before edited is not completely proper, it is possible to promote its facility when operated according to the contents designated on a job designation sheet before edited.

This is because when viewed from the user's viewpoint, there is a demand to reduce a time bounded to the job designation unit.

On the other hand, from the viewpoint of the job designation unit, when considering a case to install this system to a common compound equipment (scanner, printer, copying machine and facsimile), the rate of operation of this type of compound equipment is relatively higher than an equipment of single function and therefore, there is a demand for reducing an occupation factor of the unit.

Therefore, when the effect of the edit is sufficiently less, jobs are once processed according to the insufficient process contents of a job designation sheet before edited. Later, a user corrects the contents of processing slightly and inputs it through a terminal equipment such a personal computer (PC) on a network so that the processing of a sheet can be completed. Provision of various means is also desired to process jobs according to the contents of a job designation sheet by inputting data described on a sheet before edited without regarding them erroneous data.

SUMMARY OF THE INVENTION

It is an object of the present invention to provide a job processing system to process jobs according to contents of a job designation sheet. When, for instance, the effect of edit is sufficiently less, jobs are once processed according to the insufficient processing contents of a job designation sheet before edited. Later, a user corrects the processing contents slightly and input through a terminal equipment such as a PC on a network so that the job processing described on the sheet can be completed. Depending on the degree of the contents of edit, data described on a sheet before edited is input without regarding it as erroneous data.

According to the present invention, a job processing system using a job designation sheet is provided. This system comprises a printer configured to prepare job designation sheets including the description of specified job designation contents and prior Sheet Version Number showing the version of the job designation sheet on each job designation sheet when editing the sheet; a manager configured to manage the version of each job designation sheet according to Version Number printed on the job designation sheet; a reader configured to read the job designation sheet that has the job designation contents described and the sheet Version Number printed; a recognizer configured to recognize the described contents and Version Number of the job designation sheet read by the reader; a judging unit configured to judge whether the sheet Version Number recognized by the recognizer is the latest one according to the version of the job designation sheet managed by the manager; a first processor configured to process jobs according to the contents described on the job designation sheet recognized by the recognizer when the version of the sheet is judged as the latest version; and a second processor configured to process jobs according to the described contents of the job designation sheet recognized by the recognizer when a difference between the contents designated by the job designation sheet of the latest version and that designated by the job designation sheet is small even when the judging result of the judging unit is not the latest version.

BRIEF DESCRIPTION OF THE DRAWINGS

FIG. 4 is a flowchart for explaining a processing form 1;

FIG. 5A is a flowchart for explaining a processing form 2;

FIG. 5B is a flowchart for explaining the details of the sheet processing (STEP S22) in FIG. 5A;

FIG. 6 is a diagram showing the format of a mail requesting the modification of a job designation sheet sent to user of the job designation sheet and its contents;

FIG. 7 is a diagram showing the screen displayed on the display/designation unit to specify a sheet user by confirming a user when using the processing system;

FIG. 8A is a flowchart for explaining the processing form 3;

FIG. 8B is a flowchart for explaining the details of the sheet processing (STEP S32) in FIG. 8A;

FIG. 9 is a diagram showing the format of a mail sent to a sheet editor and its contents;

FIG. 10 is a diagram showing a display example of the display/designation unit relative to the processing form 4;

FIG. 15 is a diagram showing a display example of the display/designation unit relative to the processing form 7;

FIG. 16 is a diagram showing the contents of the updated sheet processing management database;

FIG. 17 is a table showing the correspondence of user ID, password and address to get a address of a specific user;

DETAILED DESCRIPTION OF THE PREFERRED EMBODIMENTS

Preferred embodiments of a job processing system using a job designation sheet of the present invention are described below with reference to the attached drawings.

Figure 1:
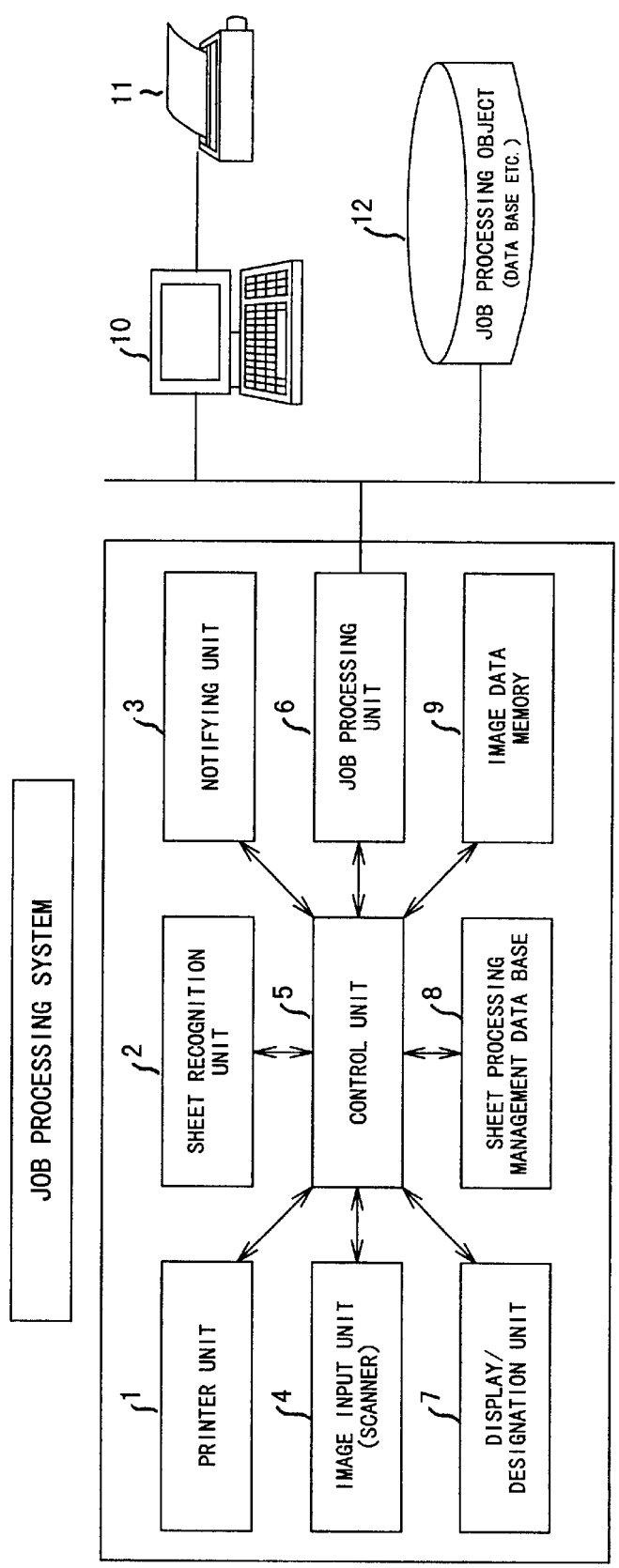
FIG. 1 is a block diagram showing the system structure to realize a job processing system according to a job designation sheet of the present invention.

FIG. 1 is a block diagram showing the system structure for achieving the job processing system using a job designation sheet according to one example of the present invention.

The job processing system using this job designation sheet comprises: an image input unit 4, a sheet recognition unit 2, a printer unit 1, a sheet processing management database 8, an display/designation unit 7, a notifying unit 3, a job processing unit 6 and a control unit 5.

The image input unit 4 is generally composed of a scanner and the like and reads catalogs that become objects of the job, documents that are desired to be copied and converts the read image into image data.

The sheet recognition unit 2 recognizes a signal, which can be read by OMR/OCR etc., such as a bar code expressing a sheet ID (Job ID & Edition Number), a mark that is a job designation from user, etc. from image data on a job designation sheet that is read by the image input unit 4.

The sheet processing management database 8 is a database that manages the information on designated contents for every version and job designation sheet for each job.

The display/designation unit 7 is normally called a control panel, displays messages/selecting items to users and receives designations from users.

The notifying unit 3 stores the processed contents of a job designation sheet in a log and notifies sheet users and sheet editor using e-mail, etc. through a network.

The job processing unit 6 actually processes a job designated by a job designation sheet.

The image data memory 9 temporarily stores image data of job processing object documents that are input from the image input unit 4.

The printer unit 1 print a job designation sheet of the latest edition when a job designation sheet of the old version is used.

When it is not required to print a job designation sheet of the latest edition, the printer unit 1 may not be provided.

The control unit 5 controls the above-mentioned units.

Further, in FIG. 1, a client PC 10, a printer 11 and a job processing object (database, etc.) 12 are shown as other elements that the job processing system.

The client PC 10 is used for preparation of a job designation sheet, edition, notification of use of a job processing sheet of the old version and correction of objects that were processed by the old version job designation sheets.

The printer 11 is used for printing of newly prepared or edited job designation sheets. The printer unit 1 can be used for this printing.

The job processing unit 6 processes documents read by the image input unit 4 according to the process designated by job designation sheets and here, the processed data are finally stored in the job processing object (database, etc.) 12 as an example.

Figures 2, 3:
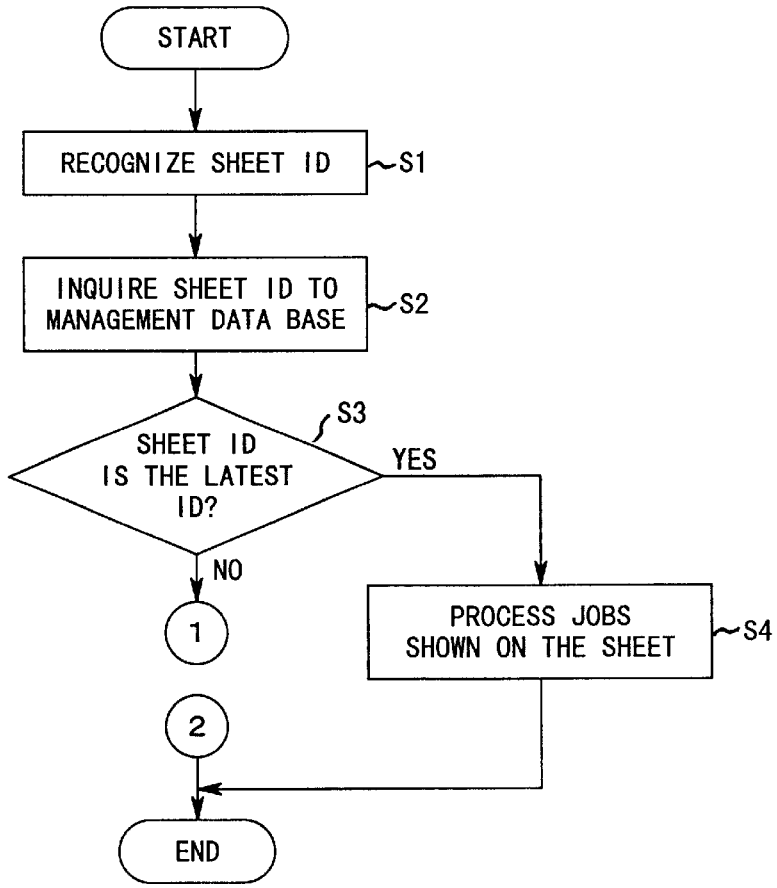
FIG. 2 is a table showing examples of sheet process management database.
FIG. 3 is a flowchart for explaining the operation of the entire system.

FIG. 2 shows an example of the sheet processing management database 8 that is tabled. As shown here, jobs are managed on a table in one line by job designation sheet with different Job ID and Edition Number Elements that are managed are job ID, Edition Number, sheet process contents, sheet print data, editor address and data processing method when a sheet that is newer than this edition is used.

FIG. 3 is a flowchart for explaining the operation of the entire system.

When job processing sheets are input through the image input unit 4, the sheet recognition unit 2 recognizes ID reflected on the sheets (Step S1) and the control unit 5 inquires the sheet ID to the sheet processing management database 8 (Step S2).

Then, when the sheet ID is the latest one, the sheet processing decided by the sheet ID is executed and the job processing designated on the job designation sheet is terminated (Steps S3 and S4). On the other hand, when the sheet ID is not the latest one, the processing is different according to each ID and this will be explained below.

FIG. 4 shows a flowchart for explaining the processing form 1.

That is, if a job designation sheet is judged to be not the latest one, using the sheet processing management database 8, print data of the latest sheet that has the largest Version Number among those sheets and the same job ID as that of used sheet are taken out (Step S11). Based on this print data, the printer unit 1 in the system prints the job designated contents (Step S12). After this printing, the processing is executed on items designated on the job processing sheet (Step S13).

FIG. 5A shows a flowchart for explaining the processing form 2.

That is, when the job designation sheet is judged to be not the latest one in Step S2 shown in FIG. 3, using the sheet processing management database 8, an editor address of the latest sheet having the largest Version Number among the sheets and the same job ID as that of the used sheet is taken out (Step S21).

Thereafter, the job processing unit 6 executes the processing of items described on the sheet (Step S22) and acquires link information to the process result.

Then, a mail containing the editor address of the latest sheet and the link information to the processing result is prepared and sent to a sheet user using the notifying unit 3 (Step S23).

As a result, a mail requesting the correction of a sheet in the format and having the contents shown in FIG. 6 is sent to a job designation sheet user.

Here, it is a special feature that the link (the underlined link) to the processing result is shown. Further, "Link" is the Hypertext and a function to refer to other text form some text and is also called as the hyperlink.

In the case where the link to the processing result is not restricted to such the hyperlink but the processing result becomes a file, it may be the presentation of a method that is able to easily reach the processing result, for instance, path information, etc. Further, "Path Information" is an expression to show file locations in a file system in the hierarchy structure.

A sheet user is able to easily reach the processing result and execute a required correction from this mail.

The user address can be obtained as shown below.

When using the job processing system, by displaying such a screen as shown in FIG. 7 on the display/designation unit and certifying a user, specify a sheet user.

As this time, using the database containing the correspondence of a user ID and address as shown in FIG. 17, an address of that user can be obtained. Further, an IC circuit card, a magnetic card, etc. may be used for specifying of a sheet user other than the certifying method shown in FIG. 7.

FIG. 5B shows a flowchart for explaining the details of the sheet processing (Step S22) shown in FIG. 5A.

That is, when the sheet processing is started, the job processing unit executes the processing of the items described on the sheet (Step S22a), returns the link information to the processing result (Step S22b) and terminates the sheet processing.

FIG. 8A shows a flowchart for explaining the processing form 3.

That is, when a job processing sheet is judged to be not the latest one in Step S3 shown in FIG. 3, using the sheet processing management database 8, an editor address of the latest sheet having the largest Version Number among those sheets and the same job ID as that of the used sheet is taken out (Step S31).

Thereafter, the job processing unit 6 executes the processing of the items described on the sheet and acquires the link information to the processing result (Step S32).

Then, a mail containing a sheet user address and the link information to the processing result is prepared and the mail is sent to the latest sheet editor using the notifying unit 3 (Step S33).

As a result, a mail shown in FIG. 9 is sent to the sheet editor.

The sheet editor is able to reach the processing result from this mail and make the correction as necessary.

Further, as the information on the sheet user is provided, it is also possible to give an instruction for the method of correction.

FIG. 8B shows a flowchart for explaining the details of the sheet processing (Step S32) shown in FIG. 8A.

That is, when the sheet processing is started, the job processing unit 6 executes the processing of the items described on the sheet (Step S32a), returns the link information to the processing result (Step S32b) and terminates the sheet processing.

FIG. 10 is an example of the display on the display/designation unit 7 concerning the processing form 4.

As illustrated, a job designation sheet of the old version is displayed on the display/designation unit 7 and the methods to deal the used sheet are presented for selection by a user.

Figure 11:
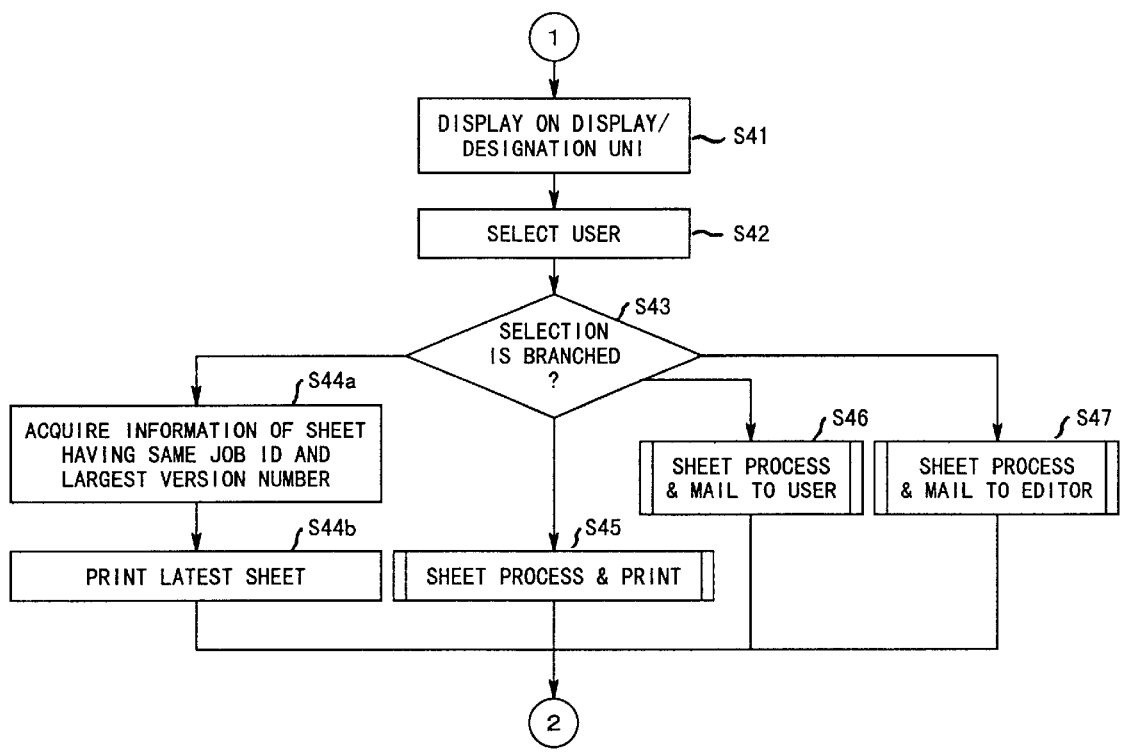
FIG. 11 is a flowchart for explaining the processing form 4.

FIG. 11 shows a flowchart for explaining the processing form 4.

That is, when a job processing sheet is judged to be not the latest one in STEP S3 in FIG. 3, a sheet of the old version that was used is displayed on the display/designation unit 7 as shown in FIG. 10 (Step S41), a user is asked to input the method to deal the sheet.

When the desired dealing of the sheet is selected by user (Step S42), the processing is branched according to the selected method (Step S43).

That is, as the first branch, after acquiring the latest ID sheet information having the largest Version Number among those sheets and the same job ID (Step S44a), "Print of Latest Sheet" is executed without executing the sheet processing (Step 44b).

As the second branch, "Sheet Process & Print" is executed (Step S45).

As the third branch, "Sheet Process & Communicate with User" is executed (Step S46).

As the fourth branch, "Sheet Process & Communicate with Editor" is executed (Step S47).

The latter three processes: "Sheet Process & Print" (Step S45), "Sheet Process & Communicate with user (Step S46) and "Sheet Process & Communicate with Editor" (Step S47) are executed as described above.

"Print of Latest Sheet" (Step S44b) is to execute the latest sheet print only without executing the sheet processing.

Figure 12:
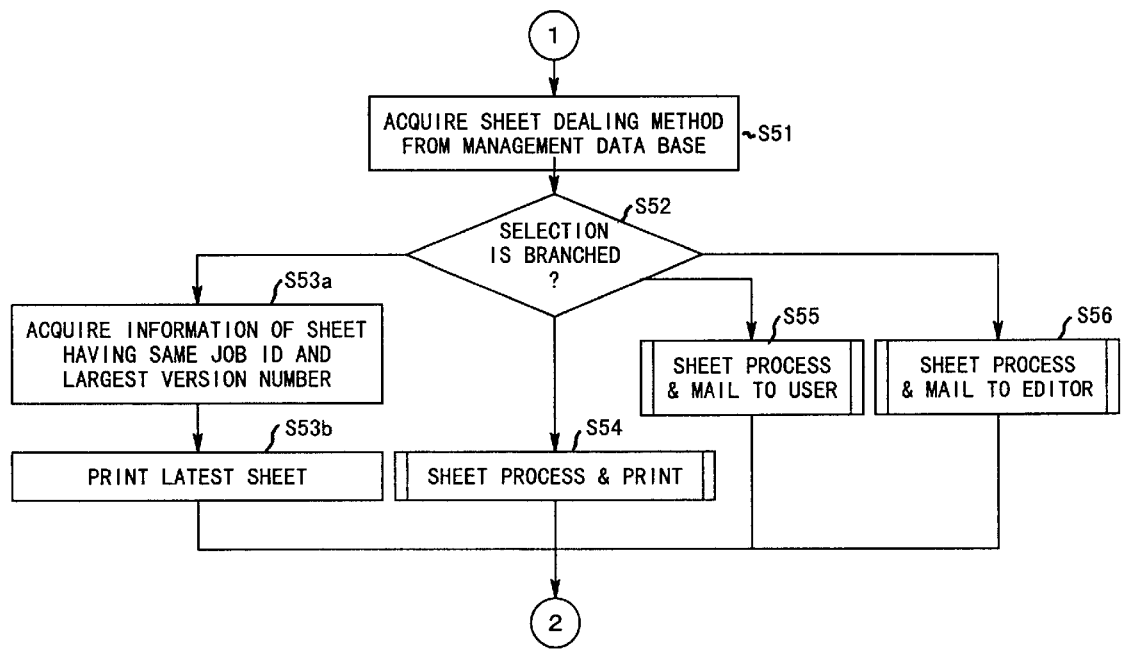
FIG. 12 is a flowchart for explaining the processing form 5.

FIG. 12 shows a flowchart for explaining the processing form 5.

That is, when a job processing sheet is judged to be not the latest one in step S3 in FIG. 3, the method to deal that sheet is acquired from the sheet processing management database 8 (Step S51).

When a method to treat is selected by user, the processing is branched according to the selected method (Step S52).

That is, as the first branch, after acquiring the latest ID sheet information having the largest Version Number among those sheets and the same job ID (Step S53a), "Print of Latest Sheet" is executed without executing the sheet processing (Step S53b).

As the second branch, "Sheet Processing & Print" is executed (Step Ss54).

As the third branch, "Sheet Processing & Communicate with User" is executed (Step S55).

As the fourth branch, "Sheet Processing & Communicate with Editor" is executed (Step S56).

Figures 13, 14:
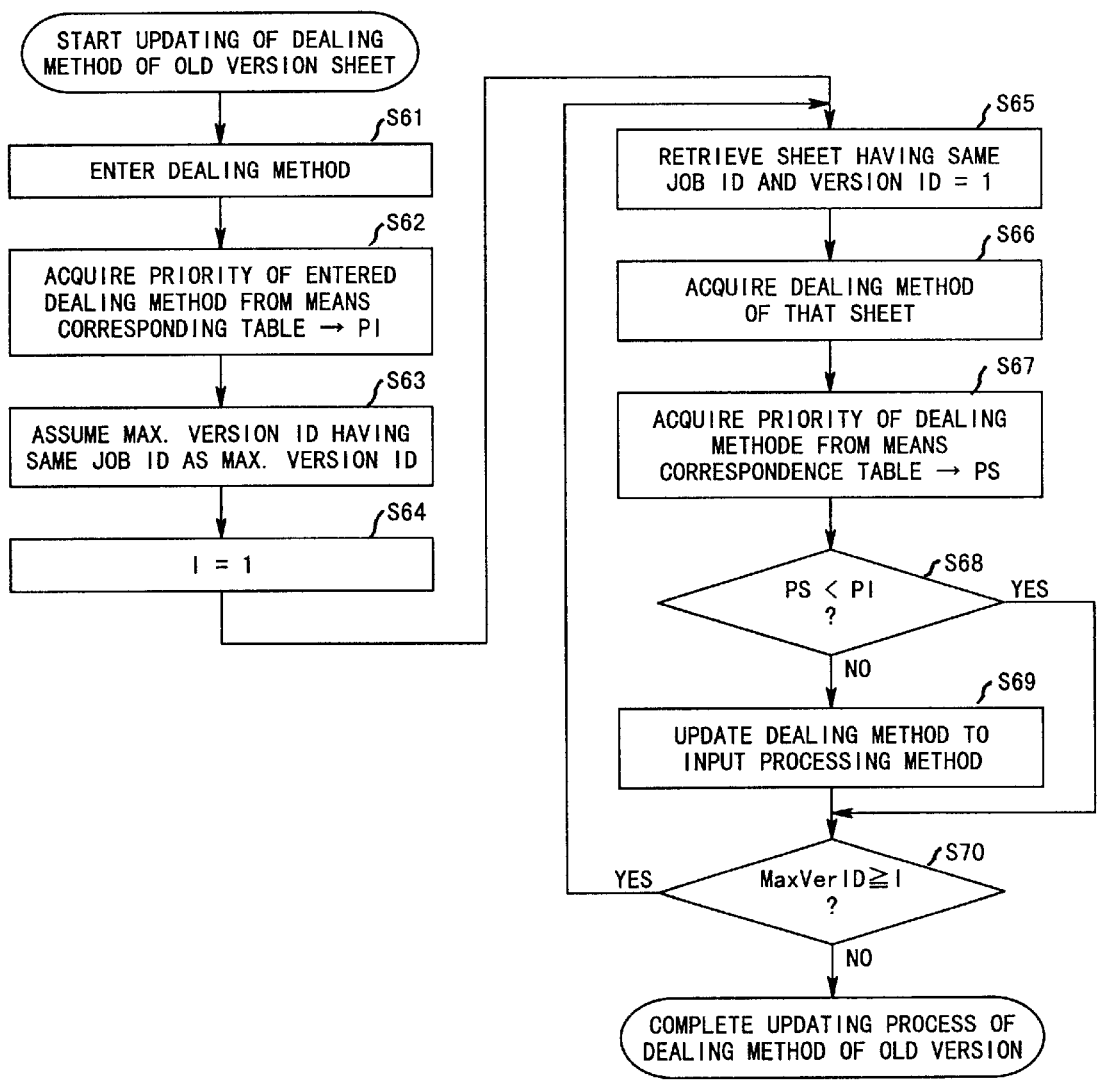
FIG. 13 is a diagram showing the processing method to realize the processing form 6 and its priority correspondence table.
FIG. 14 is a flowchart for explaining the processing form 6.

FIG. 13 shows the method to realize the processing form 6 and one example of its priority corresponding table.

Here, the required actions are classified as follows in order of high priority: "Print & Re-input", "Processing & Mail to Editor", "Processing & Mail to User", "Processing & Print of Latest Sheet" and "Processing Only".

Next, the processing form 7 is explained. When the job designation sheet that has Job ID "108011" and Edition Number "2" was used in the state shown in FIG. 2, the sheet processing management database 8 displays the treating methods on the display/designation unit 7 as shown in FIG. 15 and inquires of a user about a desired method.

FIG. 14 shows a flowchart for explaining the processing form 6.

What is shown here is the process to register an edited job designation sheet in the sheet processing management database 8.

First, a user inputs a desired action only for a sheet of the preceding edition (Step S61).

A user acquires the priority of that dealing means from the priority correspondence table shown in FIG. 13 (Step S62).

Here, the processes shown below are executed for job designation sheets that have the same job ID as that of sheets to be registered with the method to deal all sheets of former version regarded as the object for change. That is, a priority is acquired for the dealing method of individual sheet and compares it with the priority of the input dealing method. If the priority of the dealing method of the sheet is lower as a result of the comparison, the dealing method of the sheet is rewritten to the input dealing method (Step S63 through Step S70).

One example of the process executed according to the above steps is shown below.

Further, in this case, it is assumed that the sheet was registered in the sheet processing management database 8 as shown in FIG. 2.

At this time, when a sheet that has Job ID "108011" and Version Number "3" was edited and a new edition was registered, it is assumed that "Sheet Processing & Mail to Editor" was designated by a mail as a dealing method that was used for that sheet.

Further, at this time, it is seen that the priority that was input by a user using FIG. 13 is 2.

Using this priority, the dealing method for the sheets having Job ID "108011" and Version Number "1", "2" and "3" are rewritten.

At this time, the dealing method for the sheet of Version Number "1" is not rewritten because the dealing method is originally "Print & Re-Input".

The dealing method for the sheet of Version Number "2" is "Processing & Mail to User" and the priority is "3" and it is therefore rewritten to "Processing & Mail to Editor".

The dealing method for the sheet of Version Number "3" was not stipulated so far and therefore, it becomes "Processing & Mail to Editor" similarly.

FIG. 16 shows the contents of the sheet processing management database 8 after updated as shown above.

Next, as a definite example, the state of editing a sheet through the processes shown below is explained.

1. Newly prepare a sheet for the circulation.
2. Add "Internet" (Sub-category)
3. Add "Minutes" category
4. Change to "Notes".
5. Further branch "PrjB" (Sub-category) into the subcommittees.

Figure 18:
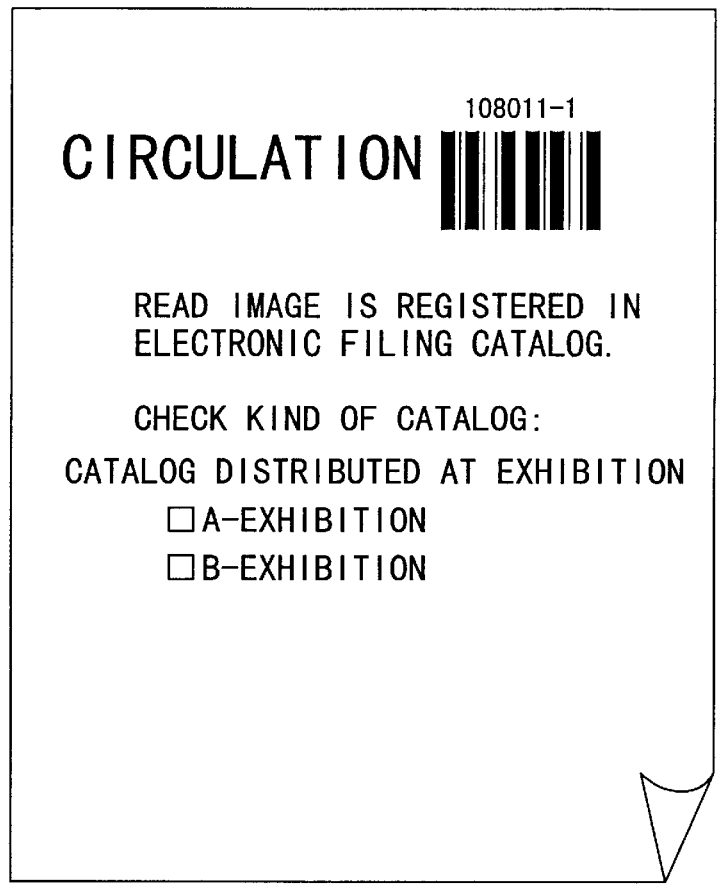
FIG. 18 is a diagram showing a job designation sheet to input a catalog through an image input unit and register that image file in an electronic filing system.

(1.1.) New preparation:

First, input a catalog through the image input unit 4 and prepare an instruction sheet as shown in FIG. 18 for registering the input image file in an electronic filing system.

The catalog is registered in the classification "Catalog" of the electronic filing system when such a sheet is used.

As a document title for registering, Exhibition-A and Exhibition-B are selectable as a title of documents when registered.

Figure 19:
FIG. 19 is a table showing the information of a newly prepared job designation sheet that is to be stored in the sheet processing management database.

At this time, information of a sheet newly prepared is stored in the sheet processing management database 8 in such a table format as shown in FIG. 19.

Figures 20, 21:
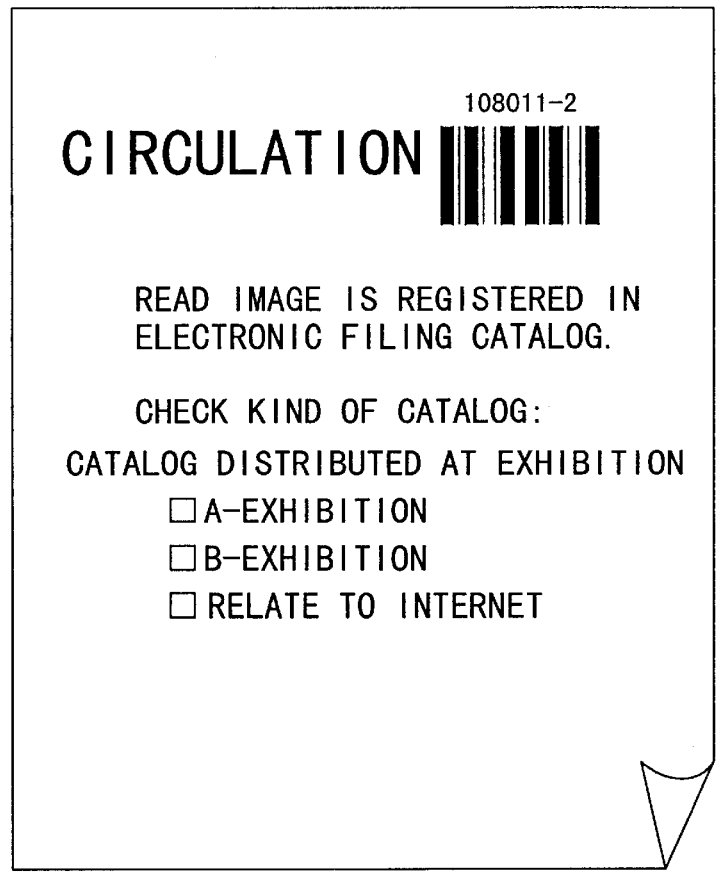
FIG. 20 is a diagram showing a job designation sheet that is edited to add "Concerning Internet"
FIG. 21 is a diagram showing the result of application of the algorithm shown in the flowchart in FIG. 14 to select "mail to Process+User" as a dealing method to be selected.

(1.2.) Addition of Internet Category:

While catalogs are arranged in order, catalogs concerning the internet are becoming much observed. So, the sheet is edited to aid "Concerning Internet" as a selectable title as shown in FIG. 20.

The information of the sheet edited here is stored in the sheet processing management database 8.

At this time, a user who edited the sheet selects a dealing method according to the degree of sheet change that was made on a preceding sheet as shown in FIG. 18.

In the change at this time, the selecting items are branched and new items are increased, there is no problem even when the change at this time is left undo for a short period.

Therefore, for the time being, it should be registered in the filing system and later, dealt by a sheet user and "Sheet Processing & Mail to User" is selected as a dealing method.

The result of the algorithm shown in FIG. 14 applied as this selection is sown in FIG. 21.

Figures 22, 23:
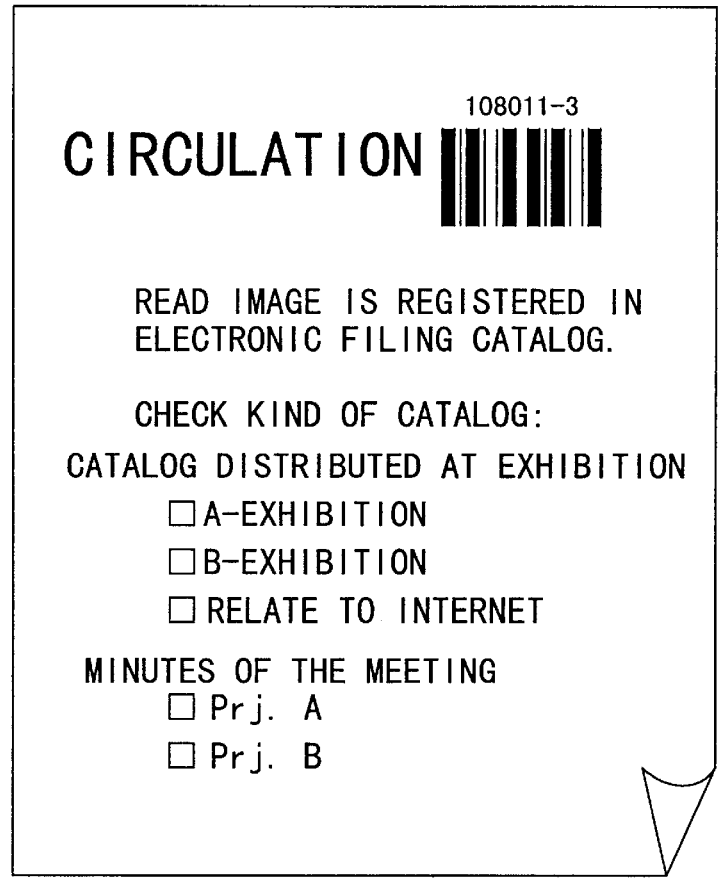
FIG. 22 is a diagram showing a job processing sheet additionally edited to cope with a demand to be able to register minutes.
FIG. 23 is a diagram showing the result of algorithm shown in the flowchart in FIG. 14 applied to the selection of "Print of Process & Latest Edition"

(1.3) Addition of Minutes Category:

To comply with demands to be able to register minutes using this sheet, this changing edit is added to the sheet as shown in FIG. 22.

The information of the sheet edited here is stored in the sheet processing management database 8.

At this time, a user who edited the sheet selects a dealing method according to the degree of sheet change that was made on a preceding sheet as shown in FIG. 20.

In the change at this time, the selecting items which are entirely not concerned are merely increased (the sheet role increased), it is not required to change what was processed using an old sheet.

However, as jobs that can be processed are increased, "Sheet Process & Print of Latest Edition" is made a selectable dealing method.

The result of this selection applied with the algorithm in FIG. 14 is shown in FIG. 23.

When the sheet shown in FIG. 18 was used in this situation, the internet selecting items are increased and as its dealing method, "Sheet Process & Notify User by Mail" remains unchanged.

Figures 24, 25:
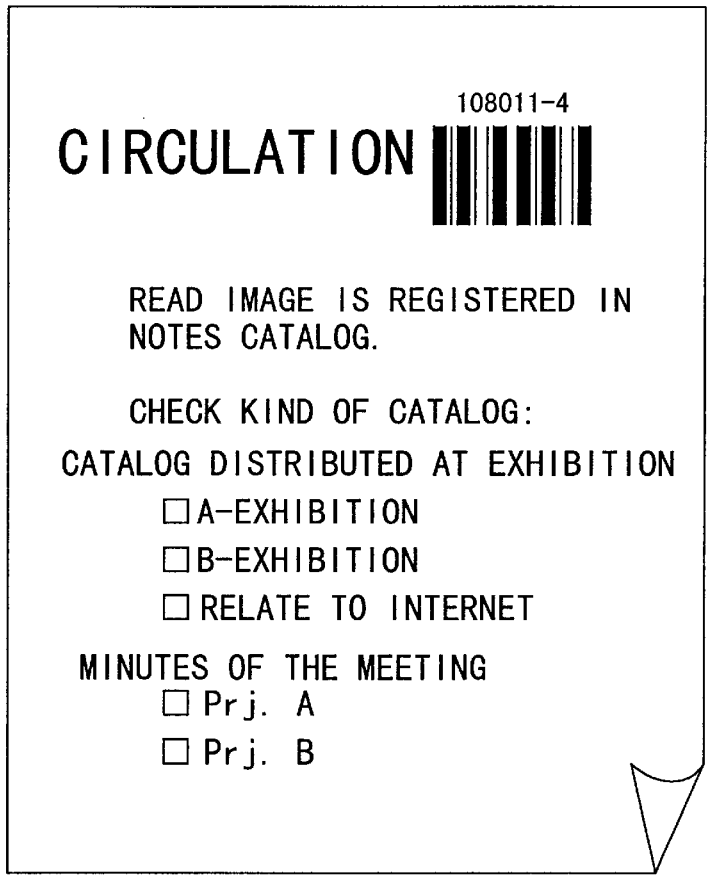
FIG. 24 is a diagram showing the job processing sheet additionally edited to cope with a demand to manage information that was managed so far by the electronic filing through Notes.
FIG. 25 is a diagram showing the algorithm shown in the flowchart in FIG. 14 applied when selecting "Print of Print & Latest Edition Print" to be selected.

(1.4.) Change of Destination of Registration to Notes:

As Notes is introduced this time, to comply with a demand to manage information by Notes instead of the electronic filing that was so far used, this changed edit is added to the sheet as shown in FIG. 24.

Further, "Notes" is a software that is called a groupware which is to progress a group work efficiently using the network, developed and selling by Louts Inc., U.S.A. This Notes has various functions including management of shared files, management of schedules, electric males, reservation of the conference room, etc.

The sheet information edited here is stored in the sheet processing management database 8.

At this time, a user who edited the sheet selects a dealing method according to the degree of sheet change that was made on a preceding sheet as shown in FIG. 22.

The change at this time can be said very large as the destination of registration was changed from "Electronic Filing Catalog" to "Notes".

Accordingly, because an extreme confusion is expected if a former sheet is used, "Print & Re-Input" is selected as a dealing method for selection.

The result of this selection with algorithm shown in FIG. 14 applied is shown in FIG. 25.

As a result, "Print & Re-Input" is automatically set as the dealing method when the sheets shown in FIG. 18 and FIG. 20 are used.

This is because the priority of the dealing method designated in FIG. 22 is higher than the dealing methods "Processing & Mail to User" and "Processing & Print of Latest Version" of the sheets shown in FIG. 18 and FIG. 20.

(1.5.) Sub-Division of Title PrjB:

This time, it is assumed that PrjB is divided into the subcommittees α and β (the plenary session of PrjB is also left).

Figures 26, 27:
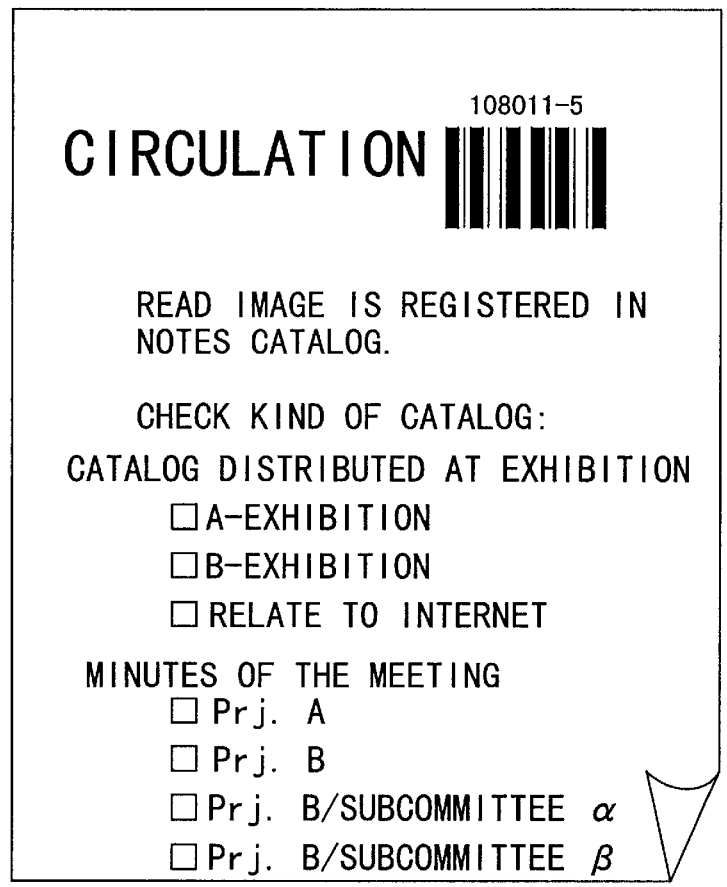
FIG. 26 is a diagram showing a job designation sheet corresponding when PrjB is divided to subcommittees α and β (the entire committee of PrjB is left)
FIG. 27 is a diagram showing the result of the algorithm shown in the flowchart in FIG. 14 applied when selecting "Process & Mail to User".

The sheet corresponding to this sub-division is shown in FIG. 26.

The information of the sheet edited here is stored in the sheet processing management database 8.

At this time, a user who edited the sheet selects a dealing method according to the degree of sheet change that was made on a preceding sheet as shown in FIG. 24.

In the change at this time, the selecting items are branched and new items are increased likewise ("Internet" Category Addition), there is no problem even when it is left undo for a short period.

Therefore, for the time being, it should be registered in the filing system and later, dealt by a sheet user and "Sheet Processing & Mail to User" is selected as a dealing method.

The result of this selection applied with the algorithm shown in FIG. 14 is shown in FIG. 27.

At this time, there is no change in the dealing method between the sheet shown in FIG. 18 and that shown in FIG. 20.

As described above, the present invention has the processing steps as shown below.

(1) Process according to a used sheet.

However, a sheet that is improved for the easy use by the sheet editing may be printed for next use.

(2) Process according to a used sheet and present the processed contents so that the processed contents can be corrected to meet the contents of a latent sheet. The method of presentation is log, print, a display/designation unit, electric mail, etc. and the technique is not cared.

(3) Process according to a used sheet and send an electronic mail, etc. with the processed contents appended to a sheet editor enabling the correction by a sheet editor so that the processed contents can be corrected to meet the latest job contents.

The presentation of these means enables user to select three means other than that to print the latest version to deal an unedited sheet by regarding it as an error.

The invention shown below relates to a means to select four definite means including the above-mentioned processing steps (1) through (3) and "Re-Input by Printing Latest Version".

(4) A means is provided to sheet user to select the above-mentioned definite means at once using the job processing system.

(5) A sheet editor designates a proper means out of the above-mentioned definite means for sheets of the old version when editing sheets in advance and if a sheet of the old version is used, the designated means is automatically selected and executed.

Shown below are the supplementary invention of (5), above.

(6) When designating a means, a means is designated only for the sheet of immediately preceding version and sheets of the version older than the immediately preceding version are automatically selected.

Accordingly, the present invention has the following effects:

(1) If the effect of use of old sheets does not become a problem in the job processing, it is possible to reduce an overhead of user by re-designation or re-reading using this means.

(2) Merits available from the later correction are that the using efficiency of the job designation system is improved because the job designation system is not used again, users who have old sheets only are able to use this system instantly; in other words, users are not restricted by the job designation system.

(3) A merit that is obtained from the correction by a sheet editor is that it is not required to explain the details of job processing changes.

Especially, when there is no time available from explaining, it is possible to recognize use of old sheets and correct and explain the using method of the latest sheet when a time becomes available.

(4) A sheet user is able to select a sheet easily in front of the job processing system depending on the change of the job processing.

Further, when a sheet user understands the job process described on an old sheet in detail, a means to divert that old sheet to other use can be provided.

(5) A sheet editor is thoroughly grasping the degree of change in the job process.

Therefore, if a sheet editor selects a proper means in advance, it is possible to avoid the confusion caused when a sheet user losses a time for selection and selects an improper means.

(6) A time and labor of a sheet editor to designate a proper means is reduced.

When jobs are processed according the sheet before edited as described in (1)–(3), a user is no longer restricted to the front of the system.

When the system is commonly used for various purposes, this is led to improvement of the utilization factor of the system.

As described above, according to the present invention, for instance, if the effect of the editing is sufficiently small, jobs are once processed according to the insufficient processing contents before edited. Later, a user corrects the processing contents slightly and inputs through a terminal equipment such as PC in a network. Thus, it is enabled to complete the sheet processing. Then, it becomes possible to provide a job processing system using a job designation sheet to process jobs according to the contents of a sheet by inputting data described on a sheet before edited without making it an error depending on the degree of the editing contents.

What is claimed is:

1. A job processing system using job designation sheets comprising:
   a printer configured to prepare job designation sheets including the description of specified job designation contents and print Sheet Version Number showing the version of the job designation sheet on each job designation sheet when editing the sheet;
   a manager configured to manage the version of each job designation sheet according to Version Number printed on the job designation sheet;
   a reader configured to read the job designation sheet that has the job designation contents described and the sheet Version Number printed;
   a recognizer configured to recognize the described contents and Version Number of the job designation sheet read by the reader;
   a judging unit configured to judge whether the sheet Version Number recognized by the recognizer is the latest one according to the version of the job designation sheet managed by the manager;
   a first processor configured to process jobs according to the contents described on the job designation sheet recognized by the recognizer when the version of the sheet is judged as the latest version; and
   a second processor configured to process jobs according to the described contents of the job designation sheet recognized by the recognizer when a difference between the contents designated by the job designation sheet of the latest version and that designated by the job designation sheet is small even when the judging result of the judging unit is not the latest version.

2. A job processing system according to claim 1, further comprising:
   a notifying unit configured to inquire whether the job processing should be continued by the second processor or the processing should be suspended and the job contents should be re-designated by the job designation sheet of the latest version if the version of a job designation sheet judged by the judging unit is not the latest one.

3. A job processing system using job designation sheets comprising:
   a printer configured to prepare job designation sheets including the description of specified job designation contents and print Sheet Version Number showing the version of the job designation sheet on each job designation sheet when editing the sheet;
   a dealing process designator configured to pre-designate a process to deal each job designation sheet of a plurality of processes of sheets of old version when editing the job designation sheets;
   a manager configured to manage the version of each job designation sheet according to Version Number printed on the job designation sheet;
   a reader configured to read the job designation sheet that has the job designation contents described and the sheet Version Number printed;
   a recognizer configured to recognize the described contents and Version Number of the job designation sheet read by the reader;
   a judging unit configured to judge whether the sheet Version Number recognized by the recognizer is the latest one according to the version of the job designation sheet managed by the manager;
   a first processor configured to process jobs according to the contents described on the job designation sheet recognized by the recognizer when the version of the sheet is judged as the latest version; and
   a second processor configured to process jobs according to the dealing process designated for a job designation sheet by the dealing process designator when the version of the sheet judged by the judging unit is not the latest one.

4. A job processing method using a job designation sheet comprising the steps of:
   preparing job designation sheets including the description of specified job designation contents and printing Sheet Version Number of the job designation sheet on each job designation sheet when editing the sheets;
   managing the version of each job designation sheet according to Version Number printed on the job designation sheet;
   reading the job designation sheet on which the job designation contents is described and the sheet Version Number is printed;
   recognizing the described contents and Version Number of the job designation sheet that is read by the reading step;
   judging whether the sheet Version Number recognized by the recognizing step is the latest one according to the version of the job designation sheet managed by the managing step;

first processing jobs according to the contents described on the job designation sheet recognized by the sheet recognizing step when the version of the sheet judged by the judging step is the latest version; and second processing jobs according to the described contents of the job designation sheet recognized by the sheet recognizing step when a difference between the contents designated by the job designation sheet of the latest version and that designated by the job designation sheet is small even when the version of the sheet judged by the judging step is not the latest version.

5. A job processing method according to claim 4 further comprising:

notifying to inquire whether the job processing should be continued by the second processing step or the processing should be suspended and the job contents should be re-designated by the job designation sheet of the latest version if the version of a job designation sheet judged by the judging step is not the latest one.

6. A job processing method using job designation sheets comprising:

preparing job designation sheets including the description of specified job designation contents and printing Sheet Version Number of the job designation sheets on job designation sheets when editing the sheets;

pre-designating a processing to deal each job designation sheet of a plurality of processes of sheets of old version when editing the job designation sheets;

managing the version of job designation sheets according to Version Number printed on the job designation sheets;

reading the job designation sheet on which the job designation contents is described and the sheet Version Number is printed;

recognizing the described contents and Version Number of the job designation sheet that is read by the sheet reading step;

judging whether the sheet Version Number recognized by the sheet recognizing step is the latest one according to the version of the job designation sheet managed by the managing step;

first processing jobs according to the contents described on the job designation sheet recognized by the sheet recognizing step when the version judged by the judging step is the latest one; and second processing jobs according to the dealing process designated for a job designation sheet by the pre-designating step when the version of the sheet judged by the judging step is not the latest one.

* * * * *